US008233672B2

(12) United States Patent
Matos

(10) Patent No.: US 8,233,672 B2
(45) Date of Patent: Jul. 31, 2012

(54) APPARATUS AND METHOD FOR VERIFYING THE IDENTITY OF AN AUTHOR

(76) Inventor: Jeffrey A. Matos, New Rochelle, NY (US)

(*) Notice: Subject to any disclaimer, the term of this patent is extended or adjusted under 35 U.S.C. 154(b) by 995 days.

(21) Appl. No.: 12/157,469

(22) Filed: Jun. 11, 2008

(65) Prior Publication Data
US 2009/0034803 A1 Feb. 5, 2009

Related U.S. Application Data

(60) Provisional application No. 60/934,043, filed on Jun. 11, 2007.

(51) Int. Cl.
*G06K 9/00* (2006.01)
(52) U.S. Cl. .............. 382/116; 340/5.53; 340/5.83
(58) Field of Classification Search .............. 382/116, 382/124; 340/5.53, 5.83
See application file for complete search history.

(56) References Cited

U.S. PATENT DOCUMENTS

| | | | | |
|---|---|---|---|---|
| 4,821,118 | A * | 4/1989 | Lafreniere | 348/156 |
| 6,250,549 | B1 * | 6/2001 | DeFabio, Jr. | 235/380 |
| 7,047,419 | B2 * | 5/2006 | Black | 713/186 |
| 2001/0033676 | A1 * | 10/2001 | Noyes | 382/119 |
| 2003/0198365 | A1 * | 10/2003 | McWilliam et al. | 382/115 |
| 2010/0045433 | A1 * | 2/2010 | Boyd et al. | 340/5.83 |

* cited by examiner

*Primary Examiner* — John Strege
(74) *Attorney, Agent, or Firm* — Eckert Seamans Cherin & Mellott, LLC

(57) ABSTRACT

A method and apparatus for identifying the writer of a document, where identifying information for each of a plurality of registered human individuals is stored in a database, calls for capturing local images of an individual making writings and/or keyboard entries and determining whether the individual making these writings and/or keyboard entries is the same as one of the registered individuals whose identifying information is stored in the database. The identifying information stored in the database includes both an alphanumeric identifier and an image of a unique, visually observable biologic identifier on a body portion of each registered individual. The local images include both:

(i) the making of the writings and/or keyboard entries by the individual whose identifying information may be stored in the database; and (ii) a body portion of this same individual on which is visible the biologic identifier.

30 Claims, 13 Drawing Sheets

APPARATUS AND METHOD FOR VERIFYING THE IDENTITY OF AN AUTHOR

CROSS-REFERENCE TO RELATED APPLICATION

This present application claims benefit of priority from U.S. Provisional Application Ser. No. 60/934,043, filed Jun. 11, 2007, entitled "APPARATUS AND METHODS FOR REMOTE VOTING AND FOR GOVERNMENT AND CORPORATE SYSTEMS BASED ON REMOTE VOTING".

BACKGROUND OF THE INVENTION

There are a multitude of situations in which it is necessary to be able to document the identity of an individual who produces visually observable material or actions indicating the thoughts or decisions of that individual. Examples of such situations involve an individual who (i) produces written text material, (ii) indicates choices on a touch sensitive screen, (iii) produces alphanumeric entries using a keyboard, (iv) produces artwork, (v) produces a musical work with written material.

SUMMARY OF THE INVENTION

It is a principal object of the present invention to provide a method and apparatus which links the image of an individual (containing identifying features), obtained during a registration process, to the image of an individual author, during his or her act of generating the observable material that reflects the author's thoughts or decisions, thereby to verify the identity of the author with a high degree of confidence.

This object, as well as further objects which will become apparent from the discussion that follows, is achieved, in accordance with the invention, by apparatus which comprises:

(a) a computer database in which are stored an image of a visible identifying feature and other identification data of each of a plurality of registered human individuals;

(b) a computer processor coupled to the database for storing information therein and for accessing selected information therefrom; and (c) one or more input devices, coupled to the processor and disposed at a local site where an individual is to create writings or make computer entries. The input device(s) includes at least one camera arranged to view and capture a local image of both the identifying feature and at least a portion of a hand of the individual that is engaged in a writing or computer entry process.

The processor is operative to store the local image(s) in said database for later retrieval, and to compare the stored identifying feature of said registered human individuals with the local image(s) of the individual's identifying feature generated during the writing or computer entry process.

By such comparison, the apparatus can thus verify that the identity of the individual who made the writing or computer entry is the same as one of the registered individuals.

Similarly, the aforementioned objects of the present invention are achieved by a method for identifying the writer of a document which comprises the steps of:

(a) storing in a database identifying information for each of a plurality of registered human individuals, this identifying information including both an alphanumeric identifier and an image of a unique, visually observable biologic identifier on a body portion of the respective individual;

(b) capturing local images which include both:
  (i) making of at least one of writings and keyboard entries by an individual whose identifying information may be stored in the database; and
  (ii) [substantially simultaneous with the capture of (i),] a body portion of said one individual on which is visible said biologic identifier; and (c) determining whether said individual making the writings and/or keyboard entries is the same as one of the registered individuals whose identifying information is stored in said database, by verifying the substantial equivalence of the local image of the visually observable biological identifier and one said images of the body portion stored in the database.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
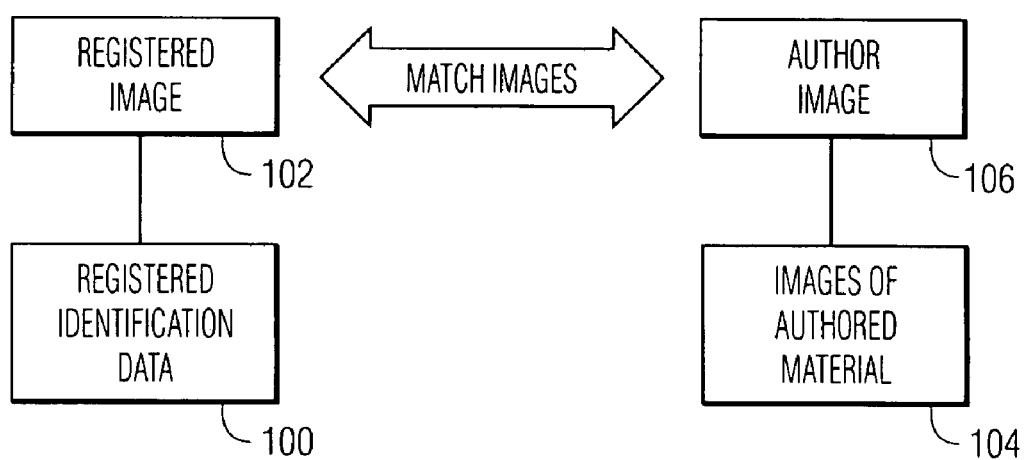
FIG. 1 shows a schematic diagram which illustrates the basic concept underlying the inventions.

The preferred embodiments of the invention will now be described with reference to FIGS. 1-13 of the drawings. Identical elements in the various figures are identified by the same reference numerals.

FIG. 1 shows the conceptual basis of one of the inventions herein. In order to prove who the author of a document is (i.e.

to prove the identity of an author of a document), the following three links are established:

1) At a registration event: a link between the name of the author (and/or other author identification data) 100 and a video image 102 that identifies the author;
2) At an authorship event (the time an author produces an original document): a simultaneously recorded image of
   a. the document as it is being authored 104, and
   b. an author image 106, i.e. an image of an identifiable feature of the author; and
3) At a verification event (a time when verification of the author identity is confirmed): a determination that the registered author image 102 is substantially identical to the author image 104 which is recorded at the time that the document is authored.

The registration event links 100 and 102; the authorship event links 106 and 104; and the verification event links 102 and 106. The net effect, symbolically is:

$$100 \leftrightarrow 102 \leftrightarrow 106 \leftrightarrow 104$$

... thereby establishing that the author is the same person as a registered person.

The document may be one of many types in which there needs to be certainty about the identity of the person who signed it, who authored it, or who indicated his or her thought(s) by one or more writings or keyboard entries. Examples include, but are not limited to:

a) a financial matter which requires a verified signature, such as a check, a loan application, a promissory note, a funds transfer, etc.;
b) a test, in which the test taker answers questions to demonstrate mastery of certain matters;
c) an original work—literary, scientific, artistic, musical, etc.
d) a vote—in a government election, a shareholder matter, etc.
e) a medical record—including an entry by a physician or nurse, a signature on a "do not resuscitate order"; a signature (by a patient or physician) on a document indicating that informed consent was obtained;
f) a legal document; such as a contract, a death certificate; a court document; a will; and
g) a political document such as presidential signature on a legislative bill, a treaty, etc.

The term "author" is intended to include each of the types of person listed in a)-g) hereinabove; and in general is anyone whose identity is to be linked to an observable event. This identity may be a name, a social security number, a medical license number, etc. The observable event generally refers to events which may be seen; But embodiments of the invention which involve only video data, or only audio data (e.g. verification of a speaker or singer) are possible. The events which may be seen include writing using a pen, pencil etc. on a piece of paper, using a virtual pen to write on a touch sensitive screen, selecting a choice from a menu using a touch sensitive screen; using an actual keyboard, and using artistic tools to create a work of art.

Figure 2:
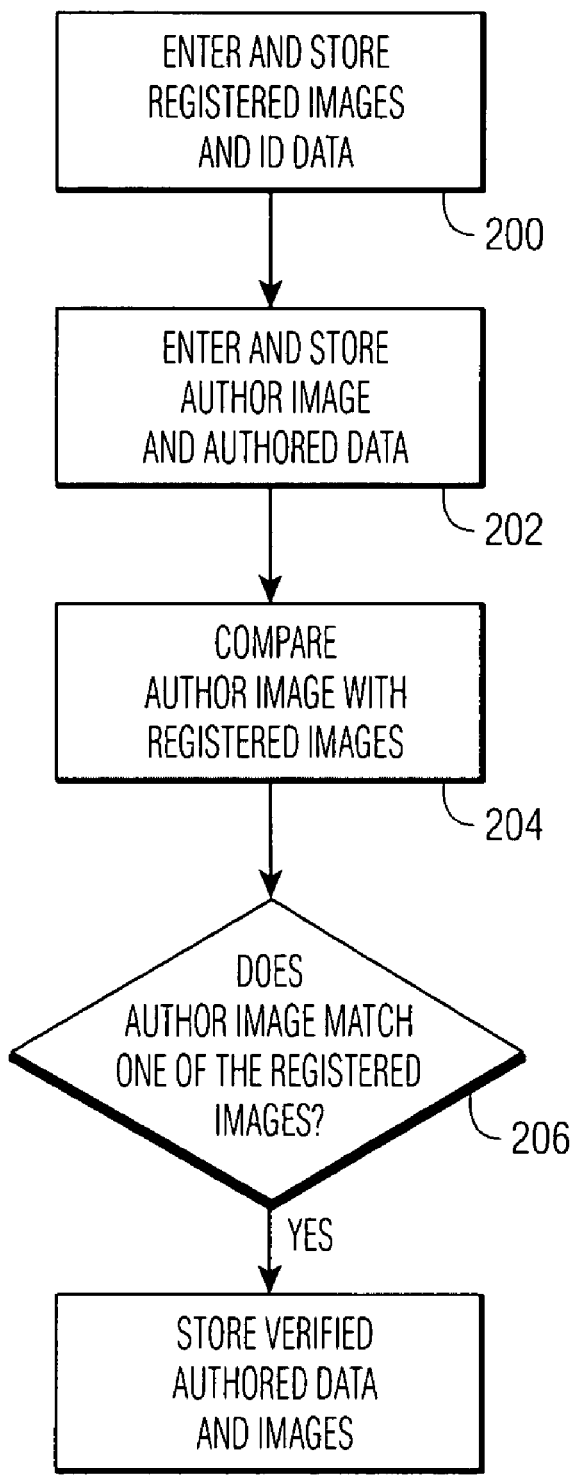
FIG. 2 shows a flow diagram of the steps followed in a preferred embodiment of the invention.

FIG. 2 is a flow diagram which parallels the conceptual schematic of FIG. 1. It shows one possible sequence of events by which the 3 aforementioned linkages may occur which link the name of an author to the authored material. First, a registration process 200 ensues, in which a link is established between "ID data" i.e. a person's name or other identifier (e.g. social security number) and registered images, i.e. a unique visual image of that person (e.g. the face, one or more fingerprints, an iris pattern, a retinal blood vessel pattern, a palm print, signature, etc.). For the registration to occur, a person—the "registrar"—must indicate that they accept the link between the ID data and the person's image. The process may be similar to an appearance before a notary public, but it could be (i) simpler (e.g. self identification), more (ii) complex (e.g. requiring multiple witnesses, and/or requiring confirmation of one or more biologic identifiers (e.g. fingerprints) from a data bank of such biologic identifiers).

Once the registrar accepts the association between the ID data and the registering person's image, the data-image pair is stored as a computer file in a database. The image of the data-image pair is then considered to be a registered image. A database may hold:

a) one or multiple registered images of one person;
b) registered images of multiple persons (which may include one or more images for each such person).

At block 202, at a time later than the registration process, an author (as defined hereinabove) who has previously registered (by the process indicated hereinabove) and who wishes to have his (male pronoun used hereinbelow without any intention of the choice indicating a preference, limitation, or advantage) identity confirmed, produces a document while simultaneous images are obtained showing:

(i) the authored data, i.e. the actual writing as it is being produced, or keystrokes as they are being registered (on either an actual or virtual keyboard); and
(ii) the author image, i.e. an identifiable biologic feature of the author.

In one preferred embodiment of the invention, the camera which captures the authored data also captures—within the same image—the author image. For example, the camera may be situated so as to capture both the face and the hands of the author, with the portion showing the hands also showing the written material/keystrokes in enough detail to identify its content. Ideally the camera would also show enough of the body region between the face and the hands, so that it was clear that the face and the hands belonged to the same person.

An example (discussed hereinbelow) which clearly demonstrates textual material and author identification in a single image, uses a device which shows author fingerprints, as the author makes keyboard entries.

In another preferred embodiment of the invention, two separate cameras may be used: one to capture the image of the biologic identifier, and one to capture the image of the textual material. The two images may stored as separate files with a secure label for each file, indicating the time and location of each image (to thereby allow for the conclusion that the two were recorded in essentially the same space and time); Alternatively, the two images may be merged into a single file, by techniques known in the art.

At block 204, the author image is compared with either (i) the registered image of the person believed to be the same person as the author; or (ii) some or all of the registered persons, if the identity of the author is either unknown, or substantially uncertain.

At block 206, a determination is made as to whether the author image and a registered image are a match. The definition of a match is further discussed hereinbelow in conjunction with FIG. 3. If a match is present, block 206 leads to block 208, and the authored data and images are labeled as verified, and stored as verified.

Figure 3:
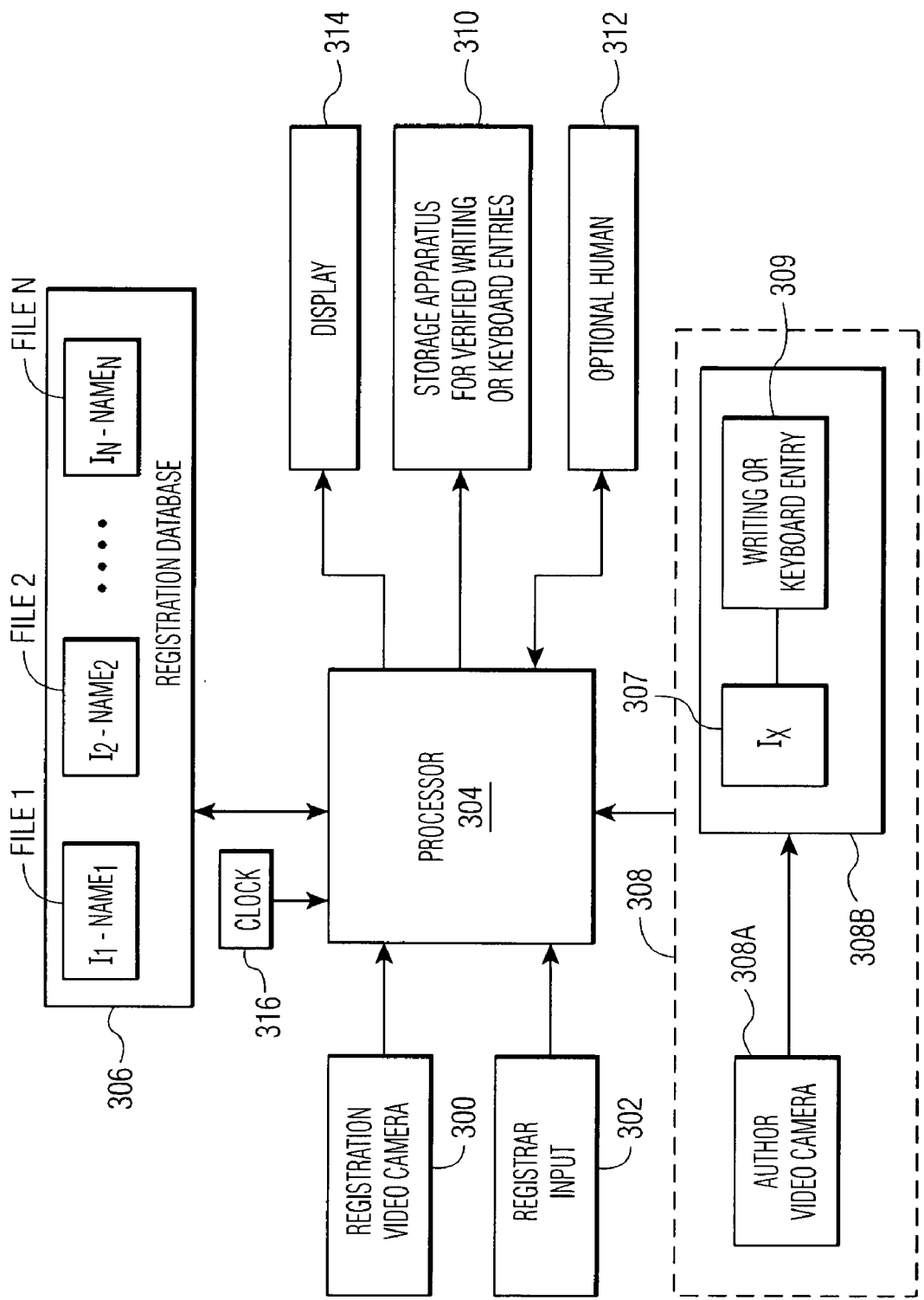
FIG. 3 shows a block diagram of the apparatus in a preferred embodiment of the invention.

FIG. 3 shows an example of apparatus which performs the functions of the invention described herein. Registration video camera 300 allows inputting of images of a biologic identifier such as a face, palm, fingerprint(s), iris or retinal image, to processor 304. A registrar confirms the name or other textual identifier (the ID data) to be associated with the image from 300, and enters the textual identifier through input 302, to processor 304. 304 produces a file which contains both the ID data and the associated video image, and stores the information as a file in registration database 306. 306 contains multiple files (e.g. FILE 1), each of which contains one person's ID data and that person's identifying image (e.g. $I_1$-$NAME_1$). 306 is preferably maintained in a highly secure environment. Various means to prevent corruption of the data contained in 306 are known in the art. Maintaining multiple copies of the database in different locations, and requiring a match with two or more copies, each in a different location is one means of enhancing the security of the database.

An author wishing to prove his identity, enters video images of (i) his work as it is being produced by him, and (ii) himself, through input device 308. Video camera 308A is used to produce file 308B, which contains simultaneously recorded author image(s) 307 and authored data image(s) 309.

In an alternate embodiment of the invention, as discussed hereinabove and hereinbelow, there may be more than one camera 308A. 308B is sent to processor 304, which then compares the author image 307 with one or more registered images in database 306. If a match is found, the author data 309—i.e. the signature, composition, document, etc. produced by the author—is then stored as verified writing or keyboard entries in storage apparatus 310. Storage apparatus 310 may be part of 306, or separate from it.

The comparison of the author image and the registered image may be:
  a) performed entirely by processor 304;
  b) performed entirely by optional human 312, who views the two images on display 314;
  c) performed by processor 304, unless the result of the evaluation by 304 results in a state of uncertainty (e.g. if there is a less than good match between the two images); In this case, the task of comparison may be handed off to human 312. Processor 304 may be pre-programmed to indicate the level of goodness of match required to bypass human 312. Processor 304 may use neural networks to facilitate the process of visual comparison.

If the final decision regarding the comparison is made by the processor, the result may be indicated on display 314. Clock 316 allows for time-stamping of images and of comparisons.

The recording by any of the cameras—either during the registration step or the authoring step—may be of a single image or of a sequence of images (e.g. a video or a "movie"). Hereinabove and hereinbelow, "image" is intended to refer to either one of these cases.

Figure 4:
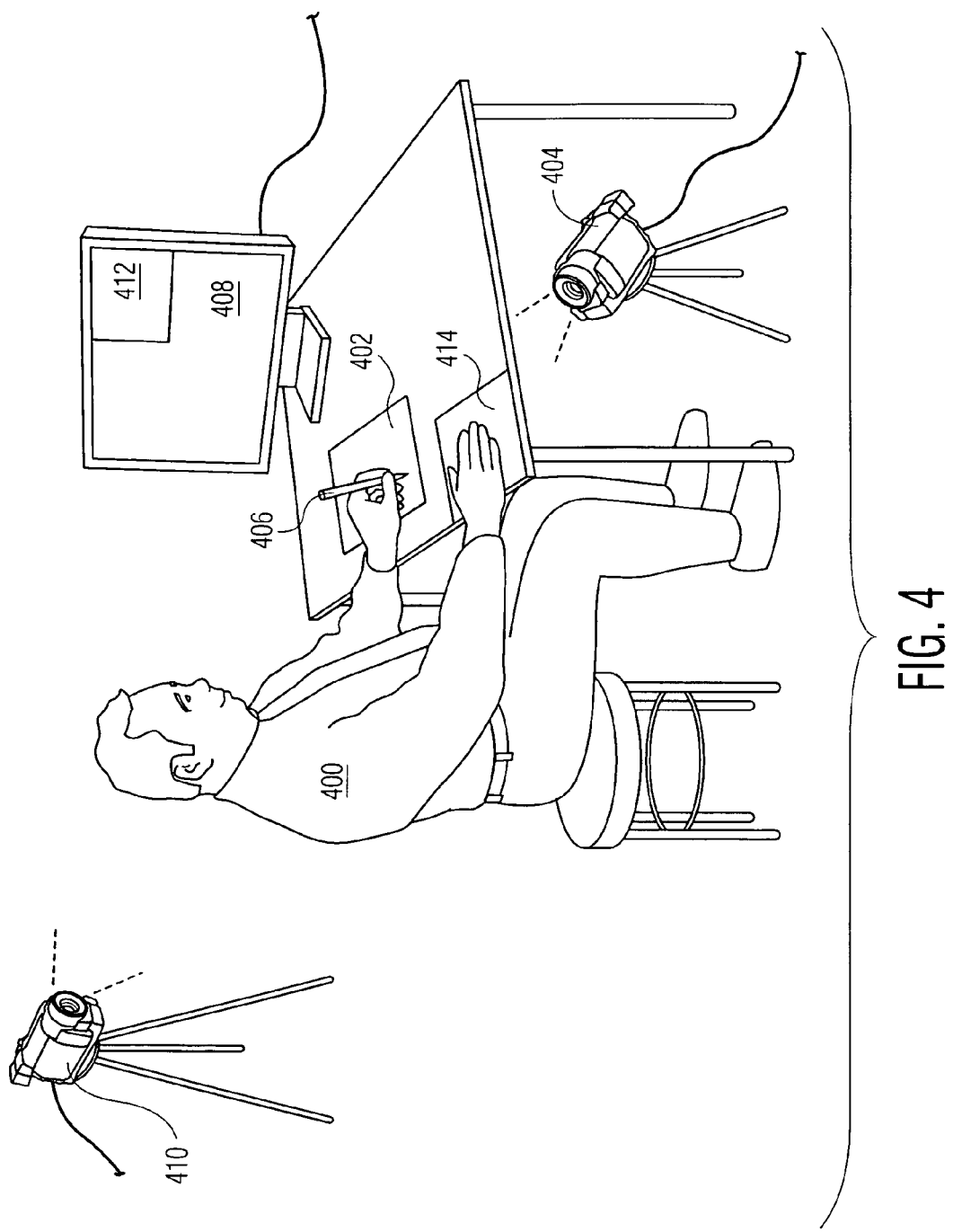
FIG. 4 shows a representational diagram of an apparatus for registration and author data and image capture.

FIG. 4 shows a person 400 using one embodiment of the apparatus shown schematically in FIG. 3. The apparatus shown in FIG. 4 may be used for:
  a) registration;
  b) entries by an author who wishes to be a verified author; or
  c) both a) and b).

In the registration process, person 400 may use the apparatus to input two or more unique identifiers simultaneously, in the same image. For example, 400 may sign his name on 402. 402 may represent:
  a) a transparent or semi-transparent surface/paper which allows a signature to be observed and recorded by video camera 404 which is situated below 402;
  b) a touch sensitive screen with enough resolution to provide a good quality copy of a signature.
404 may be used to capture both the signature and
  a) an image of the face, iris or retina of 400; and/or
  b) an image of one or more fingerprints, or a palm print of 400, visualized through transparent surface 414.

Alternatively, 404 may capture both a fingerprint/palm print and a signature, without capturing the facial/iris/retinal image.

In yet another embodiment of the apparatus used for registration, multiple identifiers may be simultaneously captured in the same image using camera 410 which is situated behind and, if necessary, somewhat to the side of (or above) person 400, and may be pointed at mirror 412. With proper placement of 410 and 412, and proper angulation of 412, camera 410 may visualize both:
  a) the signature of person 400 on 402 (which need not be transparent or semi-transparent in this case); and
  b) the face/iris/retina of person 400.

In yet another alternate embodiment of the registration apparatus, 410 and 404 may both be used to input registration information. Each may be used to input the type of information described hereinabove. The information may be stored:
  a) as two separate files, one for each camera, with each having associated ID data for the registrant, and each confirmed by the registrar (with each file preferably indicating the presence of additional registration information for the same person in another file); or
  b) as a single file.
The information from 404 and 410 may be obtained simultaneously or at separate times.

A simplified form of the registration process would be to enter only a single identifier for 400, e.g. one of the signature, facial image, etc. The apparatus in FIG. 4 could be used for this purpose. Cameras with other locations (e.g. facing 400, or above 400) are also possible. Scanning a signature or fingerprint into processor 304 (of FIG. 3), using a scanner, as is known in the art (and not shown in the figure) is also possible.

Embodiments of the registration apparatus with more than two cameras are possible. The operating principles parallel those of the two-camera case.

The apparatus shown in FIG. 4 may also be used for the entry of the author image and authored data (202 in FIG. 2). In this case, the apparatus is used to simultaneously enter:
  a) written entries or touch sensitive screen based entries; and
  b) at least one visual identifier of the author (e.g. face, signature, fingerprint(s), etc.).

The mode of operation would be the similar to that described hereinabove for the registration process, except that it may be desirable to enter more text (perhaps a lot more text) than just the author's signature. Furthermore, screen 408 may be viewed by camera 410, and may be used to display either:
  (i) textual material in a document that the author is signing; or
  (ii) a display of what the author is writing on 402 (as observed by camera 404 or another camera (not shown in this figure) which may be placed above 402), as well as the author's and/or face (as observed by camera 404 or another camera). In addition, by angulating mirror 412 so that it shows the author's face, and by properly angulating 408 and 412 and properly positioning 410, both the face (and/or iris, and/or retina) and the authored data and the author's hand and/or face as shown on screen 408, may be recorded in a single image by 410 (or in each of a series of images recorded by 410).

Figure 5:
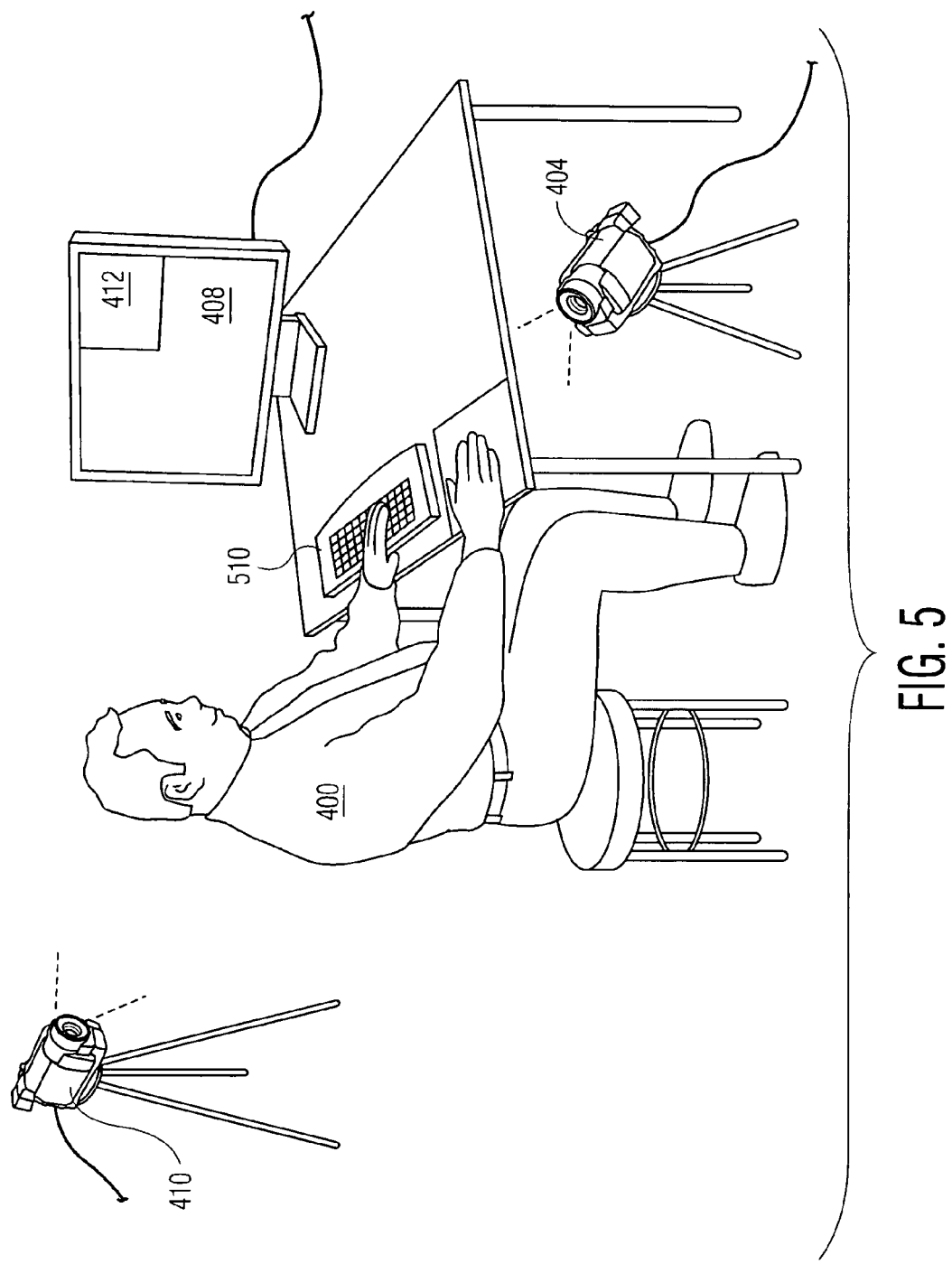
FIG. 5 shows another representational diagram of an apparatus for registration and author data and image capture.

FIG. 5 shows a version of the apparatus similar to that shown in FIG. 4, except that writing surface/touch sensitive screen 402 has been replaced by keyboard 510. All of the specification in conjunction with FIG. 4 is applicable to the apparatus shown in FIG. 5. If 510 is a conventional keyboard, then keyboard entries will not be seen from camera 404; They will be viewable from 410, with a proper geometric arrangement of 410, 408 and 412, as discussed hereinabove.

In an alternate embodiment of the invention, a largely transparent keyboard could be used for 510. This would facilitate 404 observing the face of 400.

Figure 6:
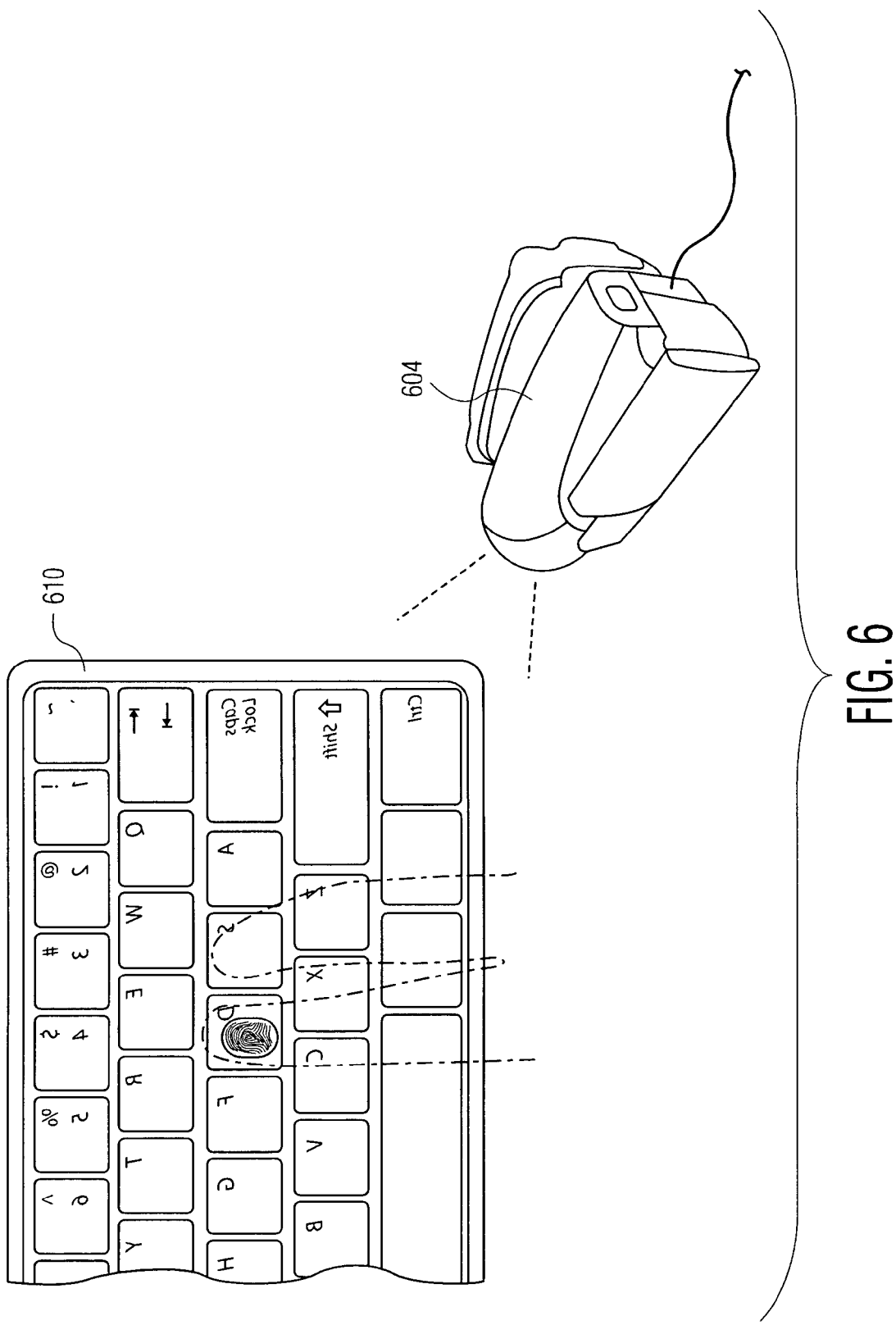
FIG. 6 shows a representational diagram of apparatus which allows for simultaneous viewing of a fingerprint and a keyboard entry.

Furthermore, a keyboard in which the key surfaces are largely transparent—shown in FIG. 6—would allow simultaneous observation of both:

a) the author's fingerprint, and
b) the sequence of selected keystrokes.

In the figure, camera 604 is positioned underneath keyboard 610, to show both fingerprints and keystrokes in each image.

Figure 7:
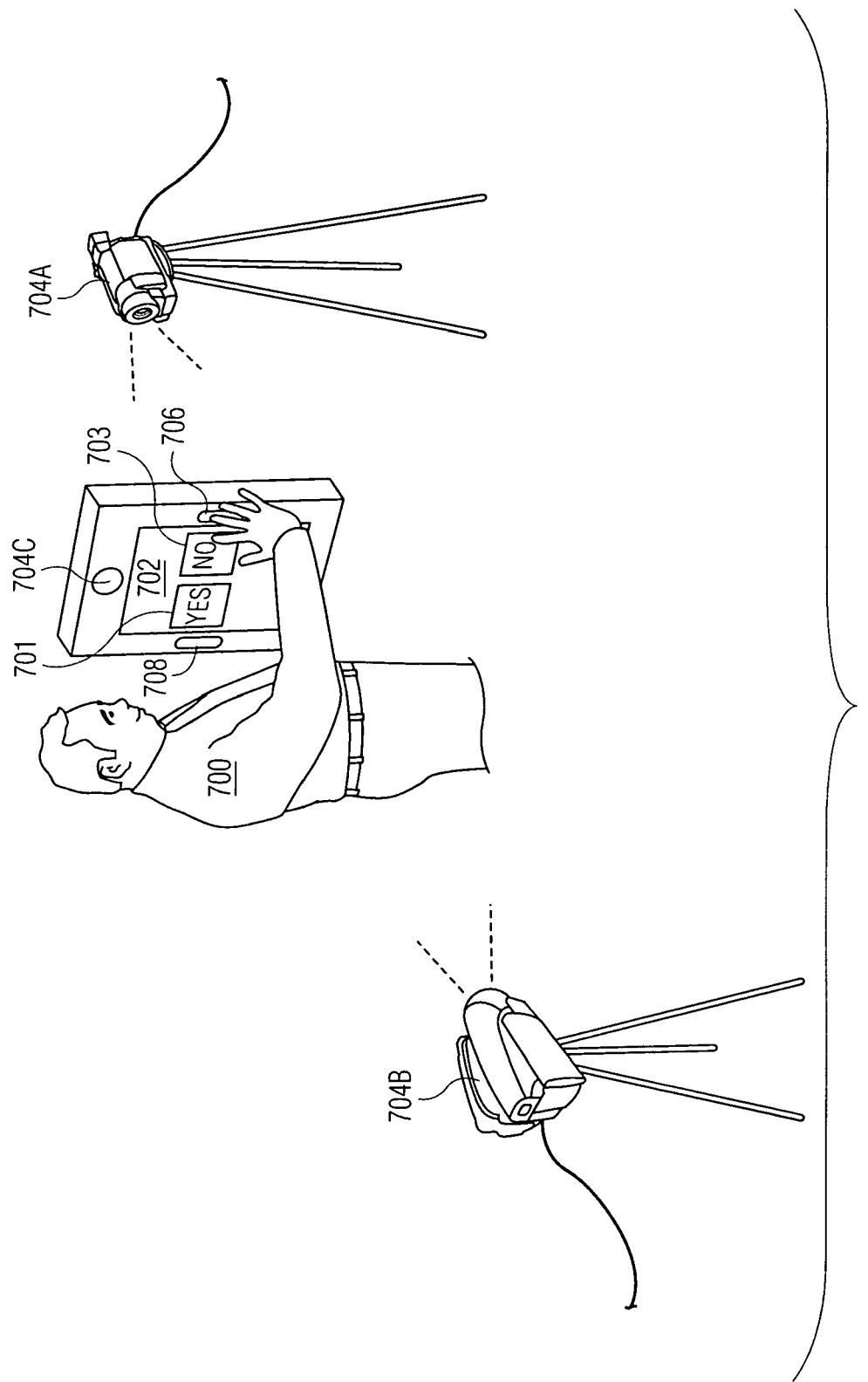
FIG. 7 shows a representational view of apparatus for simultaneously recording a fingerprint and a choice on a touch sensitive screen, containing three video cameras.

FIG. 7 shows another embodiment of the invention which allows for the simultaneous viewing by a single camera of (i) a biologic identifier of an individual making a choice, and (ii) the choice. In this case, the choice is indicated by the individual by his selection on a touch sensitive screen 702. In the figure person 700 has the option of indicating either a "yes" or a "no" choice. As shown in the figure, he may indicate "no" by touching touch sensitive box 703. As he does so, he simultaneously touches fingerprint identification apparatus 706 with another finger. The documentation that the fingerprint recorded by 706 comes from the same individual as the "no" choice may be accomplished by:

a) a camera 704A located behind the transparent or semi-transparent touch sensitive screen which records an image which shows each of (i) the finger touching the "no" choice box, 703, (ii) the contiguous parts of the hand lying between the finger which selects the touch sensitive region and the finger which is the source of the print, and, optionally (iii) the fingerprint itself, viewable through 706; and b) a camera 704B which is located behind the individual, and records the selection of the "no" choice at the same moment that the fingerprint is visualized by 706.

In the case of a "yes" choice, the functioning of the apparatus is analogous to its functioning for a "no" choice: The left hand of 700 may be used to simultaneously touch fingerprint identification apparatus 708 and touch box 701 on the touch sensitive screen.

Apparatus similar to that shown in FIG. 7 with two choices other than "yes" or "no" will function in an analogous manner to that described hereinabove. Apparatus with more than two choices will also function in an analogous manner. For example, the right side of screen 702 may contain two or more touch sensitive virtual buttons, each associated with an adjacent fingerprint scanner. In an alternative embodiment of the invention, the hand which is the source of the fingerprint need not be the source of the choice selected on the touch sensitive screen. What is required is that there be visual evidence that the individual who makes the touch sensitive screen selection is the same individual as the one who is the source of the fingerprint; This may be accomplished by camera 704A alone, or by 704A in conjunction with either (i) 704B, (ii) camera 704C, which faces the individual, or (iii) 704B and 704C together.

Figure 8:
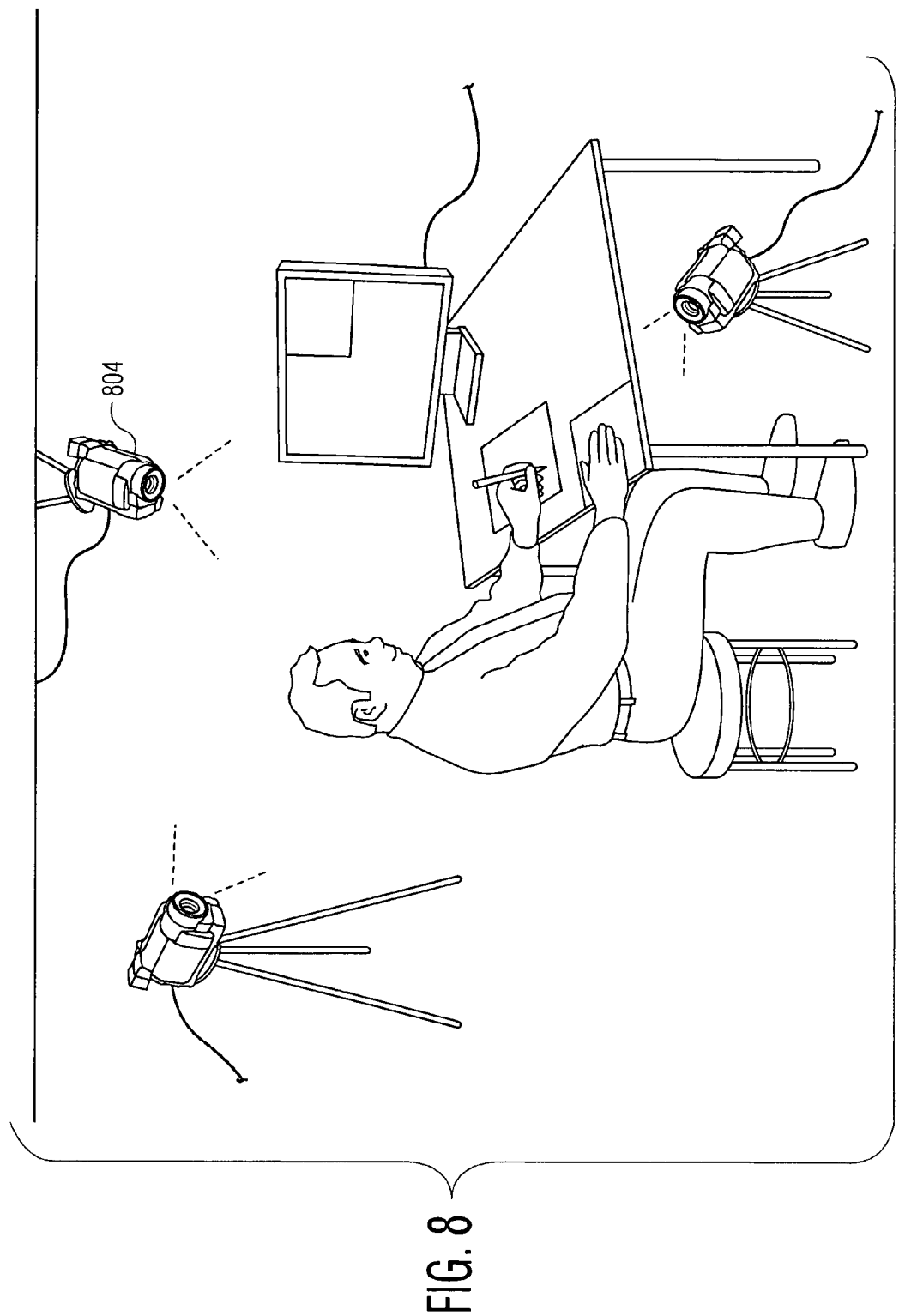
FIG. 8 shows a representational diagram of an apparatus for registration and author data and image capture, with an overhead camera.

FIG. 8 shows an example of apparatus similar to that of FIG. 4, with the addition of ceiling mounted camera 804. The purpose of the overhead camera is to simultaneously visualize both the face of the author of the writing and the writing itself. The camera need not be ceiling mounted, and could be in a variety of locations. The individual need not be writing, and could be using either a keyboard or a touch sensitive screen.

Figure 9:
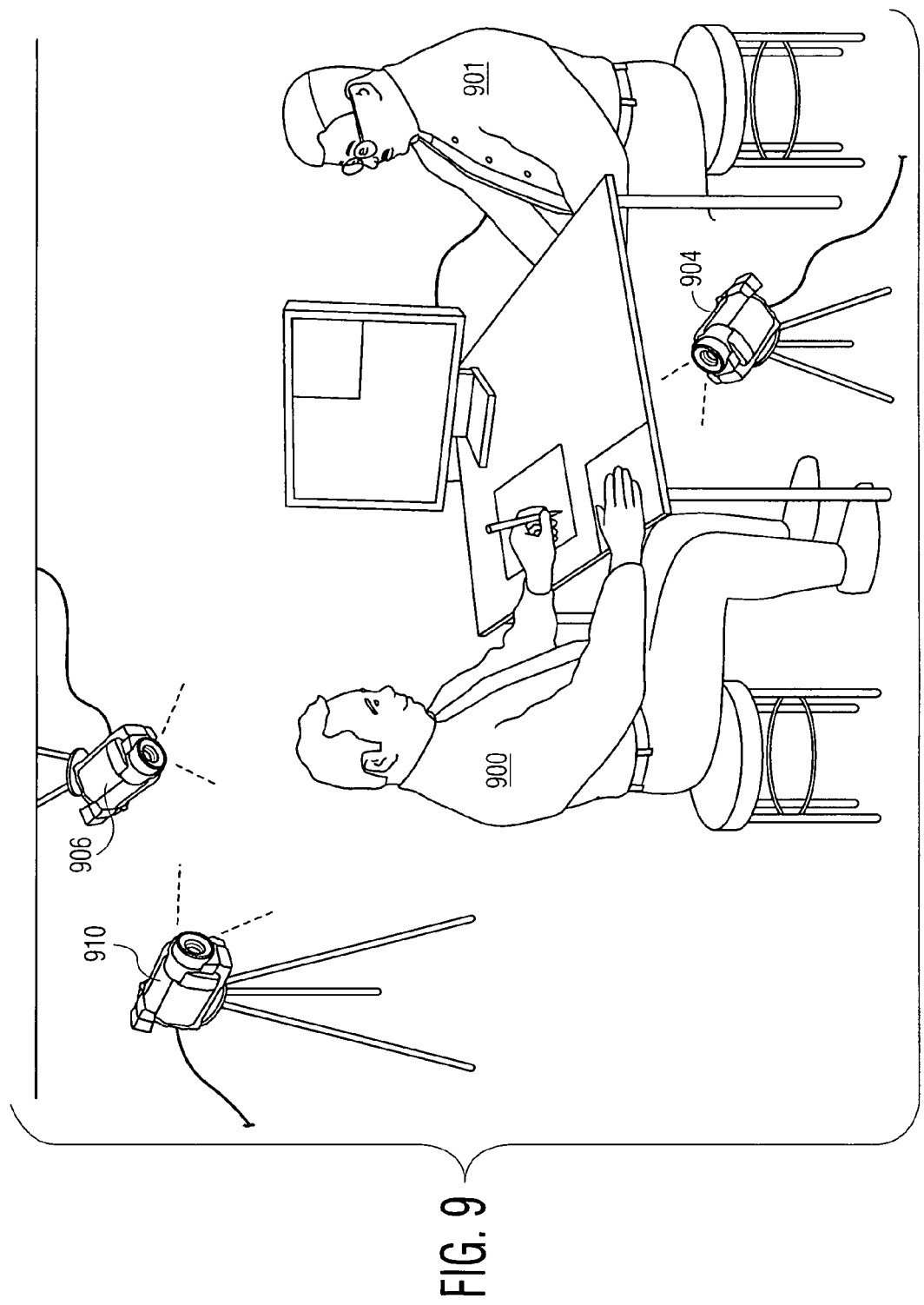
FIG. 9 shows a representational diagram of an apparatus for registration and author data and image capture, with an overhead camera and a witness to the process, whose image is also to be captured.

FIG. 9 shows the same apparatus as that of FIG. 4 with the addition of a witness 901. In one version, the witness functions as a conventional witness, i.e. he may sign a document indicating that he witnessed the writing by person 900. In another version, he may, exchange places with 900, after 900 completes his writing, and the same process (as is described in the specification hereinabove in conjunction with the apparatus shown in FIG. 4) which records one or more images of 900 may then record one or more images of 901 as he signs indicating his witnessing. In conjunction with the aforementioned two versions, the functioning of camera 904 is analogous to that of 404 in FIG. 4, and the functioning of camera 910 is analogous to that of 410 in FIG. 4. Preferably person 901 is a person who has previously undergone the registration process described hereinabove, so that his being an identifiable witness is established. In a preferred embodiment, an identifying image of the witness is captured within the same camera image as at least one of (i) an identifying image of the writing person 900, and (ii) the written material. A variety of camera locations and orientations, and, if desired, mirror location(s) and orientations may be used to accomplish this task; Cameras 906 and 910 illustrate two possible camera locations for this task.

Figure 10:
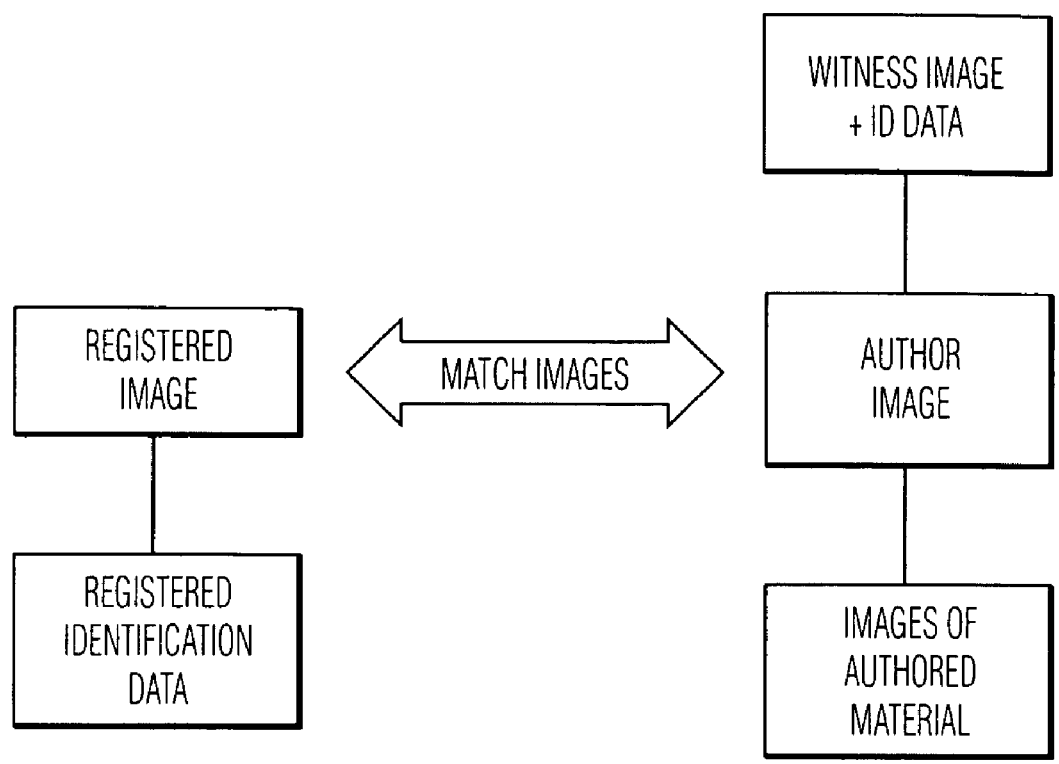
FIG. 10 shows a schematic diagram which illustrates the concept underlying the inventions when the image of a witness is captured at the time of the authoring step.

FIG. 10 shows a conceptual schematic, analogous to FIG. 1, which indicates the role of the witness in enhancing the robustness of the identification system. By including within one image:

(i) the authored material;
(ii) the author image; and
(iii) the witness image;

a highly verifiable and very difficult to corrupt/hack, system is the result. If in addition (not shown in the figure), the witness is also a person who has been registered by the same process that the author has, an even greater degree of hardening of the system is the result.

Since the registrar has the role of matching the ID data and the registered images, the robustness of the system will depend on the reliability of the registrar. Various methods of enhancing registrar reliability are possible including having multiple registrars, each of whom reviews the correctness of a paired ID data-registration image set. Yet another method of security enhancement would be to have super-registrars, i.e. people with a high level of security clearance who are responsible for registering ordinary registrars.

Figure 11:
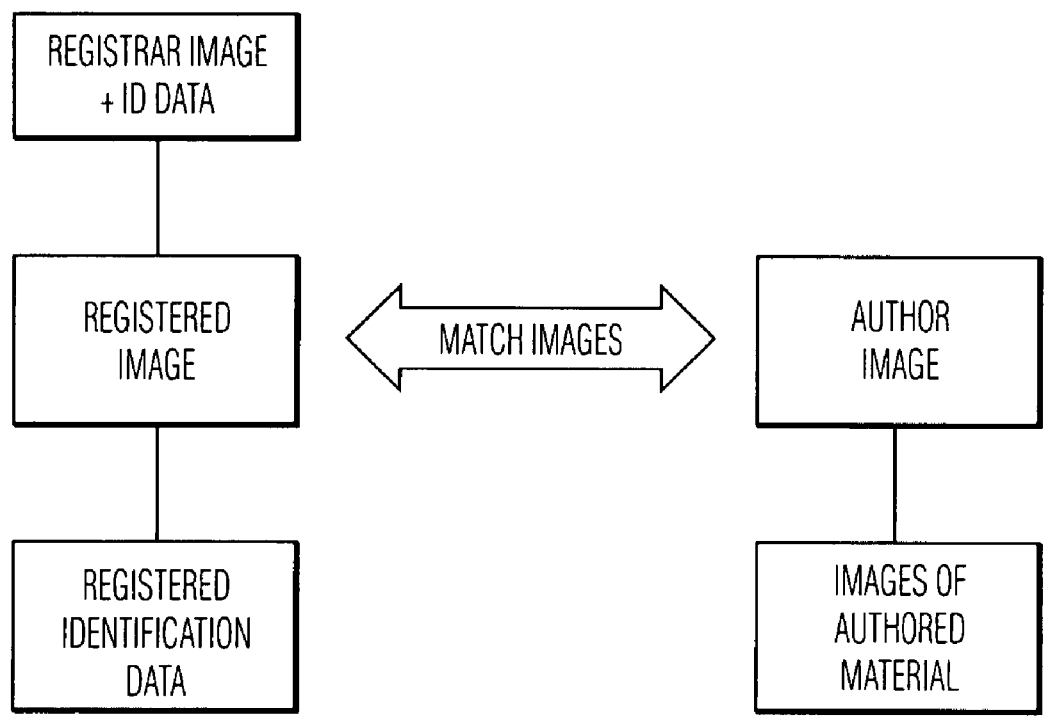
FIG. 11 shows a schematic diagram which illustrates the concept underlying the inventions when the image of a registrar is captured at the time of the registration step.

Another method of enhancing security during the registration step is shown in FIG. 11, a schematic analogous to FIGS. 1 and 10. In this embodiment, the image of a biological identifier of the registrar (obtained with apparatus such as that shown in FIGS. 3 through 6) and the image of the registered person are merged into either a single file or a single image. Alphanumeric identification of the registrar would be included in the composite file.

Figure 12:
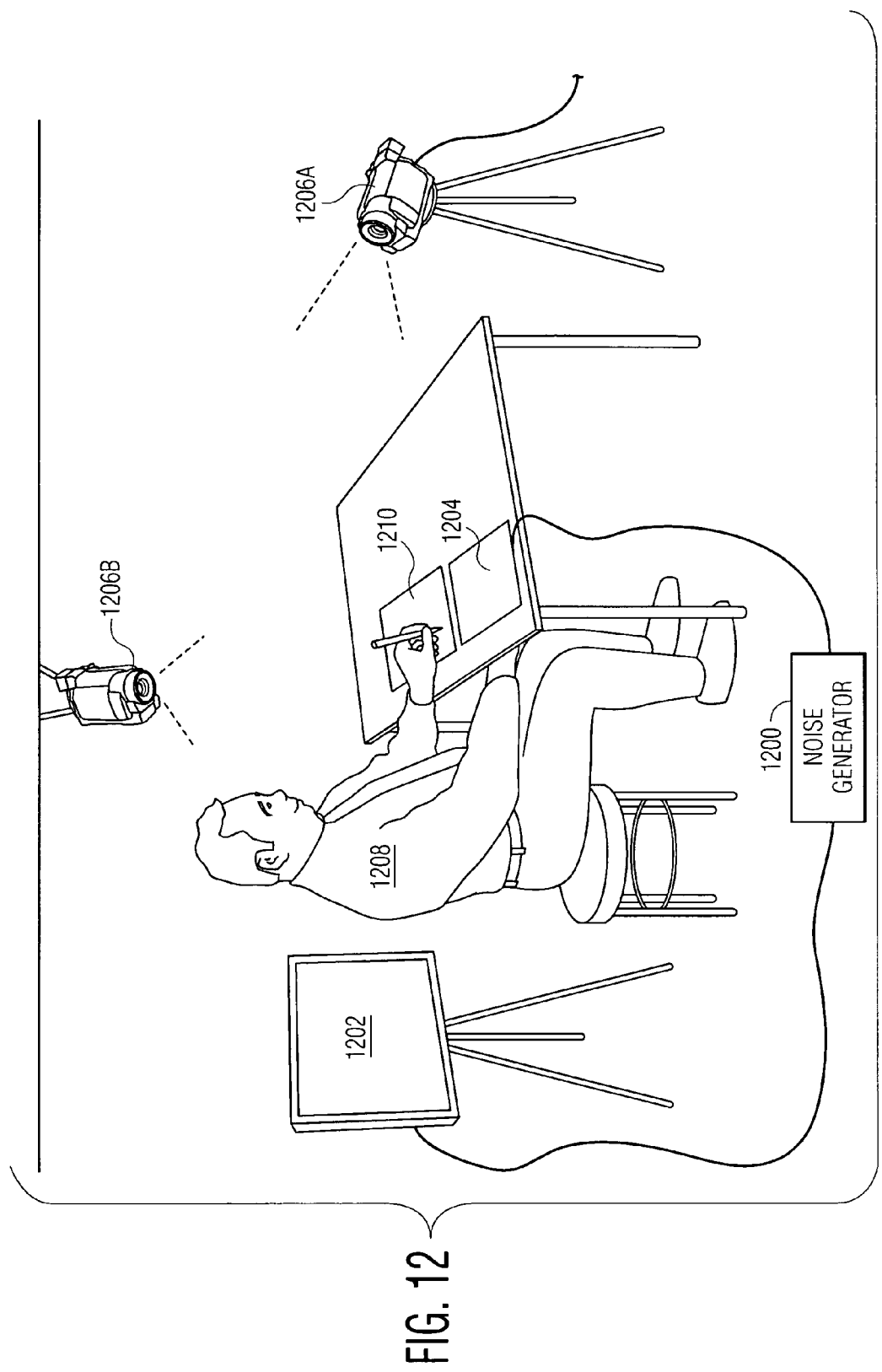
FIG. 12 shows a representational diagram of apparatus for using two identical representations of noise on each of two video screens to document that the recordings of two different cameras have been performed simultaneously.

FIG. 12 shows a method of demonstrating the simultaneity of recording of two video images on separate cameras. A noise generator 1200 generates a random, highly complex pattern, continuously changing pattern which is identically and simultaneously displayed on video screens 1202 and 1204. These screens are placed so that they may be recorded by a video camera along with the other material to be recorded by that camera. Thus camera 1206A simultaneously records both the face of person 1208 and the highly complex, continuously changing pattern on screen 1202. Camera 1206B simultaneously records the text material 1210 written by 1208 and the complex video images on 1204 (which are identical to the images on 1202). Since the task of duplicating the complex and continuously changing pattern of images displayed by 1202 and 1204 would be extremely arduous, it would make attempting to corrupt one of a pair of simultaneously recorded images (e.g. by substituting a different face), extremely difficult or impossible. 1200 may generate any one of a number of forms of very complex pattern including white noise, other noise, or even a repetitive pattern of extreme complexity.

Figure 13:
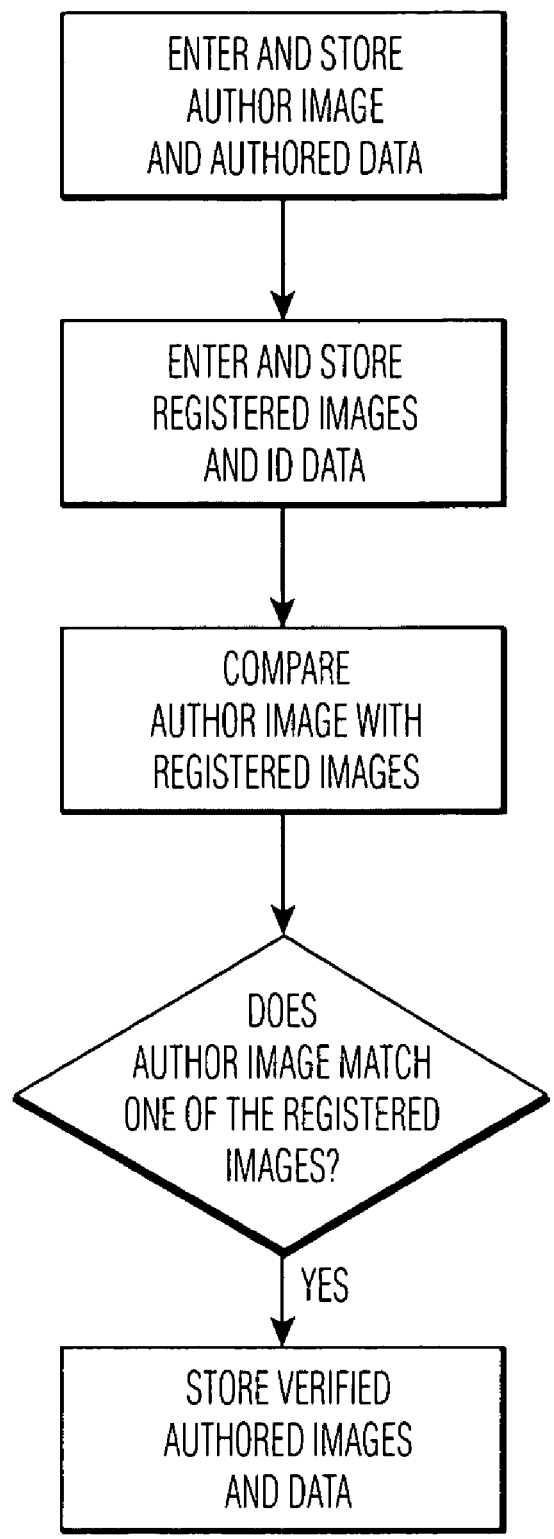
FIG. 13 shows a flow diagram of the steps followed in an alternate embodiment of the invention.

FIG. 13, analogous to FIG. 2, shows a flow diagram of another embodiment of the invention, in which the order of registration (block 200 in FIG. 2) and authorship (block 202 in FIG. 2) is reversed.

There has thus been shown and described a novel system for verifying the identity of an author which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for verifying the authenticity of writings or of entries to a computer system made by a human individual, said apparatus comprising, in combination: (a) a computer database in which are stored an image of a visible identifying feature and other identification data of each of a plurality of registered human individuals; (b) a computer processor coupled to the database for storing information therein and for accessing selected information therefrom; (c) at least one first input device coupled to said processor and disposed at a local site where an individual is to create writings or make computer entries, said first input device having at least one first camera, said first input device arranged to view both (1) the identifying feature and (2)the writings or computer entries made by the individual that is engaged in a writing or computer entry process; wherein (i) said first input device is operative to generate at least one local image of said individual's identifying feature and said writings or computer entries in sufficient detail to view their information content; (ii) said processor is operative to store said at least one local image in said database for later retrieval; and (iii) said processor is operative to compare said stored identifying feature of said registered human individuals with said local image of said individual's identifying feature generated during said writing or computer entry process to verify the identity of the individual;

thereby to verify that the individual who made the writing or computer entry is the same as one of the registered individuals.

2. The apparatus defined in claim 1, wherein said first input device comprises a single first camera, arranged to simultaneously view both the identifying feature and the writing or computer entry, such that both said identifying feature and said writing or computer entry are captured in a single, common, local image.

3. The apparatus defined in claim 1, wherein said first input device comprises multiple first cameras, arranged to simultaneously view and respectively generate said local image of both the identifying feature and the writing or computer entry.

4. The apparatus defined in claim 3, further comprising at least one video screen having a video input and a signal generator, coupled to said video input of each video screen, for producing a video signal defining a continuously varying, complex video image, and wherein said multiple first cameras are arranged to view said at least one video screen, whereby the presence of the same complex video image in a respective local image generated by each first camera is indicative that the local images were generated simultaneously.

5. The apparatus defined in claim 1, wherein said visible identifying feature comprises at least one of: (a) at least one fingerprint; (b) at least one image of a palm; (c) at least one image of the face; (d) at least one image of the retina; and (e) at least one image of the iris.

6. The apparatus defined in claim 1, further comprising a second input device, coupled to the processor and disposed at the local site, for entry of an individual's visible identifying feature for storage in the database.

7. The apparatus defined in claim 1, further comprising a keypad, coupled to the processor and disposed at the local site, for entry by a registered individual of text information.

8. The apparatus defined in claim 6, wherein the identifying feature is a fingerprint and wherein the second input device is a fingerprint scanner.

9. The apparatus defined in claim 6, wherein the identifying feature is a retinal image and wherein the second input device is a retinal scanner.

10. The apparatus defined in claim 6, wherein the identifying feature is the individual's face and the second input device is a face camera.

11. The apparatus defined in claim 1, further comprising a third input device, coupled to said processor, to facilitate making the computer entries by an individual, said third input device including at least one of (a) a keyboard, (b) a virtual keyboard; and (c) a touch-sensitive screen.

12. The apparatus defined in claim 1, further comprising an electronic clock, coupled to said processor, and wherein said processor enters said images into said database together with information indicating their time of entry.

13. The apparatus defined in claim 1, further comprising at least one mirror, disposed at the local site and arranged to allow said first input device to simultaneously view both direct and reflected images of an individual, thereby to allow the recording within one image of two separate and non-contiguous body parts.

14. The apparatus defined in claim 13, wherein one of the direct and reflected images is that of another individual who is present during the writing or computer entry process.

15. The apparatus defined in claim 13, wherein the direct and reflected images are of the same individual viewed from different vantage points.

16. The apparatus in claim 1, wherein said first input device further comprises an additional camera arranged to view from a different vantage point from that of the first camera both the identifying feature and the writing or computer entry.

17. The apparatus defined in claim 1, wherein said first input device is operative to generate a plurality of said local images in succession, and wherein said processor stores said succession of local images in said database.

18. The apparatus defined in claim 1, further comprising a keyboard with substantially transparent key surfaces, and wherein said first input device is disposed to obtain an image of a portion of a fingerprint of a finger touching any of said key surfaces when said key is pressed; thereby to obtain at least one fingerprint image while the individual makes said computer entries via said keyboard.

19. The apparatus defined in claim 1, further comprising a writing tablet with a substantially transparent writing surface, and wherein said first camera is disposed to obtain an image through the tablet of the face of the individual together with the writing during the writing process.

20. The apparatus defined in claim 1, further comprising a touch-sensitive screen with a partially transparent screen surface, and wherein at least one of said cameras is disposed to obtain an image of a portion of a fingerprint of a finger touching said screen; thereby to obtain at least one fingerprint image while the individual makes said computer entries via said touch-sensitive screen.

21. The apparatus defined in claim 1, wherein said writings and computer entries contain at least one of: (a) a signature; (b) a test or examination; (c) a vote; and (d) a document for which the individual making the writing or computer entries wishes to claim authorship.

22. A method of identifying the writer of a document comprising the steps of: (a) storing in a database identifying information for each of a plurality of registered human individuals, said identifying information including both an alphanumeric identifier and an image of a unique, visually observable biologic identifier on a body portion of the respective individual; (b) simultaneously capturing local images which include both:
  (i) making of at least one of writings and keyboard entries in sufficient detail to view the information content of said writings or keyboard entries, by an individual whose identifying information may be stored in the database; and
  (ii) a body portion of said one individual on which is visible said biologic identifier; (c) determining whether said individual making said at least one of said writings and keyboard entries is the same as one of the registered individuals whose identifying information is stored in said database, by verifying the substantial equivalence of the local image of said visually observable biological identifier, captured in step (b)(ii), and one said images of said body portion stored in the database.

23. The method defined in claim 22, wherein each simultaneously captured local image further includes an identical, continuously varying, complex video image, thereby to indicate that the local images were captured simultaneously.

24. The method defined in claim 22, wherein said visually observable biologic identifier comprises at least one of: (a) at least one fingerprint; (b) at least one image of a palm; (c) at least one image of the face; (d) at least one image of the retina; and (e) at least one image of the iris.

25. The method defined in claim 22, further comprising the step of storing said local images captured in step (b) in said database.

26. The method defined in claim 25, wherein said local images captured in step (b) are stored together with information indicating their time of capture.

27. The method defined in claim 22, wherein said local images captured in step (b) include both direct and reflected images of at least one of: (a) the individual; (b) separate, non-contiguous body parts of the individual; (c) the individual and the writing; (d) the individual and another, second individual.

28. The method defined in claim 22, wherein said local images captured in step (b) include an image of the individual and another, second individual.

29. The method defined in claim 22, wherein said local images captured in step (b) include a plurality of said images of the individual in succession.

30. The method defined in claim 22, wherein said writings and computer entries contain at least one of: (a) a signature; (b) a test or examination; (c) a vote; and (d) a document for which the individual wishes to claim authorship.

\* \* \* \* \*